Patented May 1, 1951

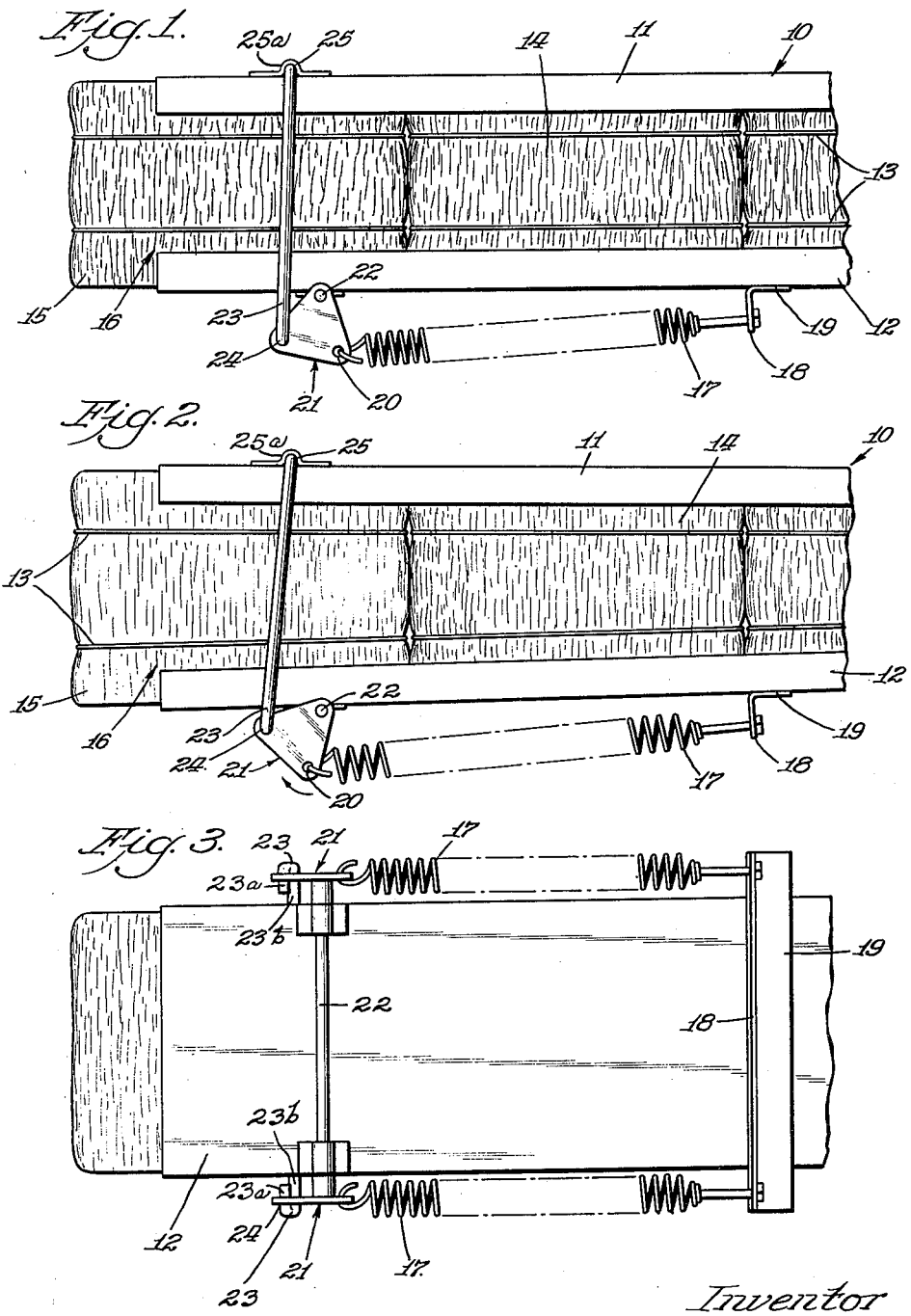

2,551,464

UNITED STATES PATENT OFFICE 2,551,464

UNIFORM TENSION APPARATUS FOR BALE CHAMBER DISCHARGE OPENINGS

Russell R. Raney, La Grange, Ill., assignor to International Harvester Company, a corporation of New Jersey Application November 20, 1946, Serial No. 711,010

1 Claim. (Cl. 100—23)

This invention relates to a new and improved apparatus for maintaining the tension constant in a bale chamber discharge opening.

It is the principal object of this invention to provide for uniform bale chamber tension regardless of the moisture content of the hay or other material being baled.

An important object of this invention is the provision of a spring and linkage arrangement for maintaining opposed sides of a bale chamber discharge opening under tension to such a degree that the friction of the material baled on the sides thereof will be continuously corrected so that it will remain substantially constant.

Another important object of this invention is to provide a safety tensioning system for bale chamber discharge openings.

Other and further important objects of this invention will become apparent from the disclosures in the following specification and accompanying drawing.

Numerous methods have been employed to exert a pressure on opposed sides of a bale chamber discharge opening. The present baling devices rely on the back pressure built up by the bale being discharged to form and compress a succeeding bale. Spring means have been employed to directly hold the opposed sides of the bale chamber together at its discharge end. Thus when the discharging bale was relatively small, its friction on the side walls would be increased by the action of the spring pulling the opposed walls together. Of course, the moisture content of the hay or material being baled caused a variance in the amount of friction created between the bale of material and the interior walls of the bale forming chamber. As the bale increases in size, the friction naturally becomes greater, and as the spring is extended, it also creates an added tendency to draw the sides of the chamber inwardly toward each other, making the total friction with a large size bale too great to permit discharge of bales and the succeeding bales are compressed too tightly. It is therefore an object of this invention to eliminate the undesirable characteristics of the spring tension devices ordinarily used on the discharge ends of bale forming chambers.

In the drawings:

Figure 1 is a top plan view showing the discharge end of a bale forming chamber incorporating the tensioning device of this invention;

Figure 2 is a view similar to Figure 1 and showing the spring and linkage structure moved to an extended position;

Figure 3 is a side elevational view of the device as shown in Figure 1; and

As shown in the drawings:

Figure 4:
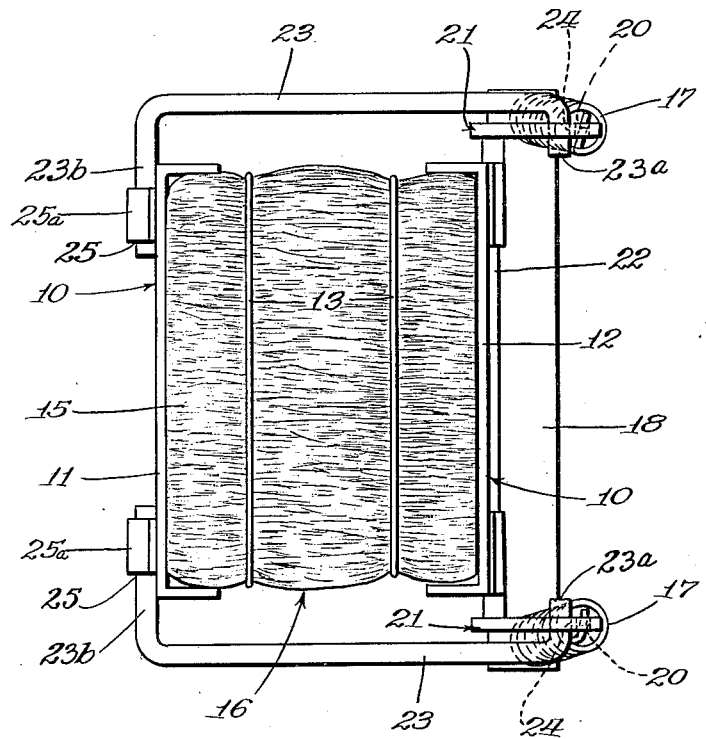
Fig. 4 is an end view of Fig. 1.

The reference numeral 10 indicates generally a bale forming chamber having opposed sides 11 and 12. The sides are preferably channel members with the flange acting as the confining influence for the top and bottom of the bales formed. The top and bottom of the bale chamber are relatively open as shown between the members 11 and 12. This enables the material being baled to be tied by strands of material shown at 13. A completely formed bale confined within the chamber 10 is shown at 14. A bale 15, previously made, is shown being discharged from the open end 16 of the bale chamber.

A relatively long coil spring 17 is anchored on an angle bracket 18 which in turn is fastened at 19 to the side of the bale chamber wall 12. The other end of the spring 17 is shown fastened to one arm at 20 of a bell-crank 21. The bell-crank is pivotally mounted at 22 on the bale chamber wall 12 and rotates in a plane at right angles thereto. The other arm of the bell-crank or plate 21 carries a bent end portion 23a of a connecting link 23 as shown at 24. The link 23 is provided at its other end with bent portion 23b which is pivoted at 25 in a bracket member 25a on the opposed side 11 of the bale forming chamber 10. The distance between the chamber walls 11 and 12 is controlled by the link 23 as the bell-crank moves the attachment point 24 of the link 23 toward and away from the side wall 12 of the bale forming chamber 10. The bale 15 within the discharge opening 16 keeps the side walls 11 and 12 spread apart. The spring 17 tends to move the bell-crank 21 in a counter-clockwise direction about its pivotal attachment 22 as viewed in Figures 1 and 2 and hence causes the side walls to be brought together. As the side walls 11 and 12 reach parallelism, the link 23 draws the walls together in increasingly lesser amounts. In other words the link attachment 24 is approaching the lower arcuate portion of the circle described by rotational movement of the bell-crank 21 about its pivot 22. When, however, the bell-crank moves in a clockwise direction as viewed from its position shown in Figure 1 to the position as shown in Figure 2, the angularity of the bell-crank 21 permits greater extension of the link 23 upon lesser rotational movement of the bell-crank. The bell-crank and link 21 and 23, respectively, cooperate with the long helical spring 17 to produce a substantially constant pressure on the sides of the bale chamber 11 and 12 regardless of whether the walls are pulled inwardly by the passage therethrough of small light bales or whether they are spread outwardly as shown in Figure 2 upon the passage of large heavy bales. A coil spring, acting directly to pull together the side walls of the baling chamber discharge opening, would apply an excessive amount of pressure on the side walls when they were extended such as shown in Figure 2 of the drawings but would apply a considerably lesser amount of pressure on the walls when the side walls were not extended such as shown in Figure 1 of the drawings. This, of course, is very undesirable as it performs exactly in reverse what is required to cause the bales to become more uniform in their constituency. In Figure 1, the long coil spring has a greater mechanical advantage in drawing the side walls 11 and 12 together and hence compensates for the fact that the spring is not at its maximum strength because it is not fully extended. In Figure 2, however, the spring 17 is extended considerably farther and thus acts with greater force. However, the mechanical advantage obtained through the bell-crank and link arrangement is considerably reduced as it has been shown that the link 23 is shortened upon lesser movement of the bell-crank 21. Hence it is obvious that there is a mechanical disadvantage occasioned in the bell-crank and link arrangement in the position as shown in Figure 2 as against the position shown in Figure 1. The spring and the linkage complement each other in such a manner that when the spring is not exerting a heavy force, the mechanical advantage is greater, and conversely when the spring is exerting a greater amount of force, the linkage has a lesser mechanical advantage with a total result that there is substantially a constant exertion of force on the side walls 11 and 12 of the bale forming chamber. The mechanical advantage of the bell-crank lever on the connecting link varies in inverse proportion to the extension of the spring 17.

As shown in Figure 3, the springs and linkage are duplicated on the top and bottom of the bale chamber so that the inward pressure on the side plates 11 and 12 is uniform throughout the entire depth. Inasmuch as the parts are identical and symmetrical, all the duplicated elements have been given the same reference characters.

I am aware that numerous details of construction may be varied throughout a wide range without departing from the principles disclosed herein, and I therefore do not propose limiting the patent granted hereon otherwise than as necessitated by the appended claim.

What is claimed is:

In a bale forming chamber, an automatic tensioning means for the discharge end thereof, said chamber having first and second spaced apart confining walls, said automatic tensioning means comprising first and second spaced apart bell-crank levers pivoted on and in a plane at right angles to the first of said confining walls, and said bell-crank levers positioned and disposed on opposite sides of said first confining wall parallel to and in substantial alignment with each other, a connecting link pivotally attached to each of said bell-crank levers at points spaced outwardly from their pivotal attachment, each of said connecting links respectively extending across and pivotally attached to the second of said confining walls, and one coil spring joined at one end to the first of said bell-crank levers and a second coil spring joined at one end to the second of said bell crank levers, both of said first and second coil spring attachments to the first and second bell-crank levers being at points spaced outwardly of said pivotal attachment and said coil springs disposed substantially parallel to one another at spaced positions on one side of the bale forming chamber, and spring attaching means on said first confining wall longitudinally spaced from said bell-crank levers, the springs being joined at their other ends to the longitudinally spaced attaching means on the first confining wall, whereby the springs tend to pivot the bell-crank levers and by means of each of said connecting links bring the confining walls closer together and the mechanical advantage of the bell-crank levers varies in inverse proportion to the extension of the springs.

RUSSELL R. RANEY.

REFERENCES CITED

The following references are of record in the file of this patent:

UNITED STATES PATENTS

| Number | Name | Date |
|---|---|---|
| 563,203 | Livengood | Sept. 22, 1896 |
| 2,227,130 | Etten | Dec. 31, 1940 |
| 2,389,510 | Hitchcock | Nov. 20, 1945 |

FOREIGN PATENTS

| Number | Country | Date |
|---|---|---|
| 584,325 | Germany | Sept. 18, 1933 |